United States Patent [19]

Wan et al.

[11] Patent Number: 4,677,095

[45] Date of Patent: Jun. 30, 1987

[54] STABILIZED ALUMINA CATALYST SUPPORT COATINGS

[75] Inventors: Chung-Zong Wan, Somerset; Joseph C. Dettling, Howell, both of N.J.

[73] Assignee: Engelhard Corporation, Menlo Park, N.J.

[21] Appl. No.: 696,946

[22] Filed: Jan. 31, 1985

[51] Int. Cl.⁴ .................. B01J 21/12; B01J 23/40
[52] U.S. Cl. ................................ 502/262; 502/263
[58] Field of Search ............................ 502/262, 263

[56] References Cited

U.S. PATENT DOCUMENTS

| | | | |
|---|---|---|---|
| 4,013,589 | 3/1977 | Buonomo et al. | 502/263 |
| 4,039,480 | 8/1977 | Watson et al. | 502/263 X |
| 4,392,988 | 7/1983 | Dobson et al. | 502/263 X |
| 4,438,219 | 3/1984 | Brandenburg et al. | 502/263 X |

Primary Examiner—Carl F. Dees

[57] ABSTRACT

A method for stabilizing alumina supports for metal catalysts by impregnating the support with an aqueous dispersion of a high molecular weight, water dispersible polyorganosiloxane and calcining.

11 Claims, No Drawings

STABILIZED ALUMINA CATALYST SUPPORT COATINGS

BACKGROUND OF THE INVENTION

1. Field of the Invention

The present invention relates to a catalyst composition and method of making the same, which composition comprises a carrier having a high surface area alumina support coating thereon, on which a catalytic metal is dispersed. More particularly, the present invention relates to alumina catalyst support compositions having initial high catalytic activity and the ability to withstand high temperatures while maintaining good activity in selected reactions over long periods of time.

2. The Prior Art

It is known to the art to prepare catalysts comprising a porous, refractory metal oxide carrier which may be formed as a monolithic skeletal body having a plurality of parallel gas flow passages extending therethrough. The carrier has a high surface area alumina support coating on which one or more platinum group metal catalytic components are dispersed. The carrier may be composed primarily of ceramic-like but porous refractory metal oxides including combined forms, for example, alumina, alumino-silicates, and magnesia-silica-aluminas, e.g. cordierite.

While suitable refractory metal oxides such as cordierite have desirable characteristics such as high temperature and thermal shock resistance which suits them for use as monolithic carriers for catalyst compositions, their surface area is too low to effectively support thereon dispersed catalytic components such as platinum group metals. For this reason, the monolithic carrier is conventionally coated with a thin coating of a high surface area alumina such as gamma alumina, or boehmite on which the catalytic metal component is dispersed. High surface area alumina is prepared by thermally treating any of the various hydrous aluminum oxides or alumina gels at temperatures in excess of 400° C., generally 450°–850° C., with the elimination of at least a portion of the chemically and/or physically combined water and hydrogen groups commonly associated therewith. Generally high surface gamma alumina or boehmite has a surface area in the range of about 100 to about 500 m$^2$/g as determined by the BET method.

Platinum metal catalysts supported on high surface alumina have found particular utility as internal combustion engine exhaust gas pollution abatement catalysts. Similar catalyst compositions have been found useful for other applications including, as disclosed in U.S. Pat. No. 3,928,961, catalytically oxidizing a fuel in a combustion operation for purposes of energy production.

In all such applications, a gaseous stream (which may comprise a fuel or combustible pollutants and oxygen in cases where oxidation is to be carried out) is passed over the catalyst, and the reactive components of the gas stream contact the catalytic metal component in order to catalyze the reaction.

A common deficiency associated with alumina supported catalyst systems is the thermal degradation of the catalyst support from extended exposure to the high temperature gases which are encountered in use of the catalyst system. At temperatures of 800° C. or more, the alumina undergoes phase transformation with accompanying rapid loss of surface area and a considerable shrinkage in volume. When the alumina support undergoes this thermally imposed phase transformation, the metal catalysts dispersed on the alumina support either become occluded in the shrunken support with a loss of exposed catalyst surface area or are expelled from the support to encounter drastic sintering, both the occlusion and expulsion phenomena resulting in a significant deactivation in catalyst activity.

The art has attempted a number of methods to ameliorate the thermally induced phase transformation of the alumina support. For example, silicon dioxide, zirconium oxide, alkaline earth oxides and rare earth oxides such as ceria oxide or lanthanum oxide have been admixed with the alumina support material to retard the phase transition of high surface area gamma alumina to low surface area alpha alumina. However, when the so-modified alumina support is exposed to the exhaust gases of a moving vehicle such as in an automobile catalytic muffler in a manifold position where the temperatures may reach levels higher than 1,100° C. for extended periods of time, the modified alumina is often unable to retain its thermal stability properties. In applications such as high temperature steam reformers, where the operating conditions include pressurized steam at temperatures greater than 800° C., the deterioration of the stabilized alumina is accelerated.

Another method devised by the art to improve the thermal stability of alumina supports is represented by British Pat. No. 1,492,274 wherein the alumina support material is impregnated with a low molecular weight silane compound such as alkyl orthosilicates.

According to the patent, the organo-silicon compound is impregnated in the liquid phase on the alumina either in its undiluted liquid form or diluted in an organic solvent at room temperature or by vapor phase deposition at a temperature above the boiling point of the organo-silicon compound. After the impregnation step, excess impregnant is then removed from the alumina at elevated temperatures in an inert atmosphere. Although the use of the organo-silicon compounds disclosed in the British patent are effective to improve the thermal stability of the alumina treated therewith, the disclosed method requires the use of costly, highly flammable organo-silicon compounds and the method to remove the excess compound is wasteful of material and thus relatively costly. Also, an environmental concern is raised with the method disclosed in the British patent as any leaking of the volatile and flammable organo-silicon compounds into the working environment represents a serious safety and environmental hazard.

There is therefore a need in the art to provide a simpler, less costly and less hazardous method whereby the thermal stability of alumina catalyst support materials can be improved.

SUMMARY OF THE INVENTION

The present invention is directed to fulfilling the need in the art for improved methods of producing stabilized catalysts by providing an improved method for imparting thermal stability to an alumina support having a metal catalyst dispersed therein, the method comprising impregnating the alumina support with an aqueous dispersion of a high molecular weight polyorganosiloxane (silicone) composition having an average molecular weight in excess of about 1,500 and thereafter calcining the polyorganosiloxane impregnated alumina. The siloxane polymers used in the practice of the present invention are relatively low cost, water soluble or water dispersible polymers. As water is the diluent for the siloxane polymer, the safety and environmental hazards associated with organic solvents used as diluents for the silicon containing compounds used by the prior art are totally avoided.

As the water dispersible siloxane polymers have low volatility at the drying temperature, e.g. 100°–150° C. and are substantially non-flammable, there is no requirement to remove excess siloxane from the impregnated alumina support material in an inert atmosphere prior to calcination. In practice, it has been determined that the high molecular weight siloxane polymers used in the practice of the present invention upon calcination of the impregnated alumina essentially completely convert to an active thermal stabilizing species.

As the water dispersible, high molecular weight siloxane polymers used in the practice of the present invention are low in cost and have low volatility and are non-flammable, these polymers provide a simple, inexpensive, non-hazardous means to effect thermal stabilization of alumina support materials.

DETAILED DESCRIPTION OF THE INVENTION

The polyorganosiloxane polymers used in the practice of the present invention are water dispersible polymers consisting essentially of the repeating units

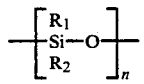

where $R_1$ and $R_2$ are selected from hydrogen, alkyl radicals to 1 to 8 carbon atoms, and mononuclear aryl radicals. Since the polymers are generally a mixture of repeating chain units of various chain lengths, it is convenient to characterize the polymer properties in an average way. The average number of repeating chain units, n, of the polyorganosiloxane polymer is generally greater than 17 and preferably from 20 to 150.

The high molecular weight siloxane polymers used in the present invention are normally practically water insoluble. To render the siloxane polymer water dispersible, the siloxane polymer chain may be branched or endcapped with a polar group containing a radical such as carbonyl, hydroxyl or amino group.

Alternatively, a colloidal dispersion of the siloxane polymer can be prepared using emulsifying agents. A variety of emulsifiers can be used such as electrolytes, gelatinous colloids, resin soaps, water-soluble gums, fatty acids and their derivatives, alcohols, sulfonates and their derivatives, etc. In general, a molecule of an effective emulsifying agent may usually be described as having one end soluble in silicone such as alkyl chain and the other end soluble in water such as an ionic group or a polar group. Non-ionic emulsifiers are preferred in preparing water dispersible high molecular weight polyorganosiloxanes used in the practice of the present invention.

The water dispersed polyorganosiloxanes can be prepared using conventional procedures such as passing a mixture of the polyorganosiloxane, emulsifier and a small amount of water through a high shear blending device such as a colloid mill or homogenizer to prepare a paste. The paste is then dispersed in a larger amount of water with vigorous agitation. The final product is a silicone-in-water emulsion, dispersion or admixture containing about 50 percent by weight of the siloxane polymer.

Emulsified high molecular weight siloxane polymers are commercially available. For example, an emulsified siloxane polymer having an average siloxane chain length of 70 and an emulsified siloxane polymer having a siloxane chain length of about 100 are both commercially available from the General Electric Company under the trademark designations GE Silicone Emulsion SM2133 and GE Silicon Emulsion SM2162 respectively.

Water soluble high molecular weight siloxane polymers also useful in the practice of the present invention include polyether siloxanes such as siloxane oxyalkylene block copolymers. These polyether siloxanes are generally synthesized so that a polyoxyalkylene ether such as polyethylene oxide or polypropylene oxide is introduced into a polydimethyl siloxane. The resulting product can be readily diluted with water to form an aqueous siloxane polymer solution.

The alumina support materials which are impregnated with the high molecular weight siloxane polymers in accordance with the practice of the present invention include the high surface area aluminas such as boehmite, gamma, eta, kappa, theta and delta phases preferably having surface areas over 80 $m^2/g$ as distinguished from the relatively lower surface area, alpha phase of alumina. Boehmite is, of course, converted to gamma alumina upon calcination.

Impregnation of the alumina support material with the aqueous dispersion of the high molecular weight siloxane polymer can be accomplished by any conventional method such as spraying the alumina powder with an aqueous dispersion of the polyorganosiloxane or by flowing a stream of the polymer dispersion through a bed of the alumina particles under vacuum or by simply admixing the siloxane polymer dispersion with an aqueous slurry of alumina powder.

The temperature at which impregnation of the alumina is accomplished is not critical but preferably impregnation is conducted at a temperature of about 20° to about 80° C. when polymer emulsions of high viscosity are used for impregnation.

After the impregnation step, the siloxane polymer impregnated alumina is calcined at a temperature of at least about 400° C. and preferably about 450° to 600° C. for about 1 to about 20 hours.

Preferably, prior to the calcination step, the impregnated alumina is first dried at an elevated temperature, as by forced air drying or spraydrying, for example, between about 100° and 200° C. and most suitably at about 120° C. prior to the calcination treatment. The calcination treatment converts the silicon content of the siloxane polymer to the active oxide, $SiO_2$, which then interacts with the alumina particles at the calcination temperature to stabilize the alumina and prevent the transition from a high surface area form to a low surface area alpha form when exposed to working temperatures in excess of 1,000° C. Also, the calcination step serves to pyrolyze the hydrocarbon moiety of the siloxane polymer as well as any tramp hydrocarbon materials associated with the polymer.

To obtain a useful improvement in thermal stability, the aluminum support material is impregnated with sufficient siloxane polymer material so that after calcination about 1 to about 20 percent by weight $SiO_2$ and preferably about 4 to 15 percent by weight $SiO_2$ based on the combined weight of the alumina material is incorporated in the alumina support material.

In one manner of preparing catalysts using the polyorganosiloxane thermally stabilized alumina support material, an aqueous slurry or "washcoat" containing the siloxane polymer treated calcined alumina admixed with a soluble or dispersed form of a metal catalyst is prepared. The metal catalyst generally a Group VIII metal normally in the form of a water soluble salt. The metal catalyst is present in a minor, catalytically effective amount sufficient to provide compositions having significantly enhanced catalytic activity, and generally the metal content of the catalyst does not exceed about 20 weight percent of the weight of the alumina support and is preferably dispersed on the alumina support material at a concentration of about 0.02 to about 5 percent by weight when platinum group metals are used.

Platinum group metals useful in preparing catalytic compositions in combination with the stabilized alumina support coatings of the present invention include platinum, ruthenium, palladium, iridium and rhodium and mixtures or alloys of such metals. It is a preferred practice of the present invention that catalyst compositions prepared using the siloxane polymer treated alumina support materials prepared in accordance with the present invention be comprised primarily of palladium, platinum or rhodium supported on the siloxane polymer stabilized alumina, as such compositions exhibit superior stability after long term exposure to high temperature, e.g. 1,000° C. or greater, environments.

When used as internal combustion engine exhaust gas pollution abatement catalyst, the metal catalyst/siloxane treated alumina washcoat is applied to a monolithic support. Thereafter, the washcoated monolith is calcined at a temperature of about 120° C. to about 600° C. for about 1 to about 20 hours to drive therefrom the aqueous medium of the slurry and to leave on the monolith a dry, adherent coating comprised of stabilized alumina support particles having dispersed therein a suitable metal catalyst such as palladium or rhodium.

The following examples are presented to more completely describe the present invention, it being understood that the examples are intended to be only illustrative and not limiting.

EXAMPLE I

Twenty-one grams of gamma alumina powder were admixed with 10 grams of GE Silicone SM 2162, an aqueous emulsion containing 50% by weight of a siloxane polymer having the general formula

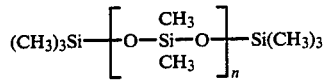

the average molecular weight of the polymer being about 10,000.

The gamma alumina impregnated with the siloxane polymer was dried at 120° C. for 2 hours and then calcined in air at 450° C. for 1 hour. Analysis of the calcined alumina indicated it had a surface area (BET) of 187.5 m$^2$/g and contained 12% by weight SiO$_2$.

EXAMPLE II—(Comparative)

For purposes of comparison, the general procedure of Example 4 in British Pat. No. 1,492,274 was repeated wherein 20 grams of alumina of the type used in Example I herein were immersed in 40 milliliters (ml) of (C$_2$H$_5$O)$_4$Si and were kept in contact with the liquid for 4 hours and then slowly dried in air at ambient temperature over a 70 hour period. The dried sample was placed in a tubular reactor, flushed with nitrogen at room temperature for 5 hours and then slowly heated to 170° C. for 1 hour and further treated in nitrogen at 500° C. for 1 hour. When the nitrogen stream was stopped, air was introduced into the reactor for an additional 2 hours at 500° C. A silane stabilized alumina was obtained having a surface area (BET) of 194 m$^2$/g and a SiO$_2$ content of 6 weight percent. This comparative silane stabilized alumina was designated "C$_1$."

For further purposes of comparison, 23 grams of the gamma alumina used in Example I were impregnated with 17 grams of an aqueous solution containing 2.5 grams colloidal silica of 40 Å particle size. After drying at 120° C. for 72 hours and calcining in air at 450° C. for 1 hour, a silica stabilized alumina was obtained having a surface area (BET) of 188 m$^2$/g and an SiO$_2$ content of 10 weight percent. This comparative silica stabilized alumina was designated "C$_2$."

For still further purposes of comparison, 475 grams of the gamma alumina used in Example I was impregnated with an aqueous Ce(NO$_3$)$_3$ solution. After drying at 120° C. for 16 hours and calcining in air at 950° C. for 1 hour a ceria stabilized alumina was obtained having a surface area (BET) of 144 m$^2$/g and a CeO$_2$ content 5 weight percent. This comparative CeO$_2$ stabilized gamma alumina was designated "C$_3$."

For purposes of additional direct comparison, the gamma alumina used in Example I was tested without incorporating any stabilizer compound. This gamma alumina (control) was designated "C$_4$."

The thermal stability of the polyorganosiloxane stabilized gamma alumina prepared in Example as well as the comparative stabilized aluminas designated C$_1$–C$_4$ was treated by aging 1–2 gram samples of the aluminas by calcination in air for 1 hour periods at temperatures of 1,000° C., 1,100° C., 1,200° C. and 1,300° C. The results of these aging tests are recorded in Table I.

TABLE I

| | GAMMA ALUMINA AGING TESTS | | | |
|---|---|---|---|---|
| | (BET) Surface Area, m$^2$/g Aging Temperature | | | |
| Run No. | 1,000° C. | 1,100° C. | 1,200° C. | 1,300° C. |
| Ex. 1 | 162.7 | 136.0 | 75.0 | 16.0 |
| C$_1$ | 160.5 | 135.0 | 72.6 | 14.1 |
| C$_2$ | — | 105.2 | 33.7 | — |
| C$_3$ | 127.5 | 70.5 | 11.4 | 4.0 |
| C$_4$ (Control) | 126.0 | 53.7 | 2.5 | 1.0 |

By reference to Table I, it is immediately apparent that stabilization of gamma alumina with a high molecular weight siloxane polymer in accordance with the present invention, improves the thermal stability of the alumina especially when compared with colloidal silica (C$_2$), CeO$_2$(C$_3$) or control (C$_4$). Although the stabilization process of the present invention achieves a substantially equivalent improvement in thermal stability as the process disclosed in British Pat. No. 1,492,274 (C$_1$), the improvement is achieved in a simpler, less costly, less time consuming and less hazardous manner.

EXAMPLE III

One hundred (100) grams of boehmite slurry containing 10% Al$_2$O$_3$ were thoroughly admixed with 40 ml aqueous dispersion of siloxane polymer containing 4 grams of GE Silicone SM2162.

The siloxane polymer impregnated boehmite slurry was dried at 120° C. for 16 hours and then calcined in air at 450° C. for 1 hour. Analysis of the calcined silicone stabilized alumina indicated it had a surface area (BET) of 350.6 m²/g and contained 11% $SiO_2$.

EXAMPLE IV

The procedure of Example III was repeated except that 40 ml aqueous silicone solution containing 4 grams of GE Silicone SF1188, a copolymer of polydimethyl siloxane and polyoxyalkylene ether was substituted for the water dispersed GE Silicone SM 2162.

The air calcined, siloxane polymer impregnated boehmite powder had a surface area of 337 mg²/g and an $SiO_2$ content of 5.5% by weight.

EXAMPLE V (COMPARATIVE)

For purposes of comparison, the procedure of Example III was repeated with the exception that 40 ml of an aqueous solution containing 0.5 gram $CeO_2$ as $Ce(NO_3)_2$ was substituted for the diluted GE Silicone SM2162. The dried boehmite was calcined at 950° C. for 1 hour. This comparative calcined ceria containing alumina designated "$C_5$" was found to have a BET surface area of 189 m²/g.

For purposes of further comparison, the procedure of Example III was repeated with the exception that 2 grams of tetraethyoxysilane $((C_2H_5O)_4Si)$ was substituted for the diluted GE Silicone SM2162. The dried boehmite was calcined at 450° C. for 1 hour. This comparative calcined $SiO_2$ containing alumina designated "$C_6$" had a BET surface area of 290 m²/g.

For purposes of additional direct comparison, the boehmite slurry used in Example III was tested without incorporating any stabilizer compound. This comparative air calcined (450° C.) boehmite powder (control) designated "$C_7$" had a BET surface area of 297 m²/g and was identified as gamma alumina in structure.

The thermal stability of the polyorganosiloxane stabilized boehmite powders prepared in Examples III–IV as well as the $CeO_2$ stabilized boehmite ($C_5$), the tetraethyloxysilane stabilized boehmite "$C_6$" and the unstabilized boehmites ($C_7$) was tested following the aging procedure of Example I. The results of these aging tests are recorded in Table II.

TABLE II

| | BOEHMITE AGING TESTS | | |
|---|---|---|---|
| | Surface area, m²/g Aging Temperatures | | |
| Run No. | 1,100° C. | 1,200° C. | 1,300° C. |
| Ex. III | 150.8 | 92.2 | 29.0 |
| Ex. IV | 158.2 | 93.1 | 29.8 |
| $C_5$ | 110.8 | 43.7 | 5.6 |
| $C_6$ | 91.0 | 21.2 | 4.0 |
| $C_7$ | 85.0 | 7.5 | 2.7 |

By reference to Table II, it is immediately apparent that boehmite stabilized with a high molecular weight siloxane polymer prepared in accordance with the present invention (Example III–IV) exhibits improved thermal stability especially when compared to $CeO_2$ stabilized boehmite ($C_5$) and the unstabilized boehmites ($C_7$).

It should be especially noted that boehmite slurry incorporated with either the water soluble block copolymer of polydimethyl siloxane and a polyoxyalkylene ether or the water dispersed polydimethyl siloxane polymer shows a substantial improvement in BET surface area retention over the temperature range 1,100° C.–1,300° C. similar to that improvement obtained employing the incipient wetness method demonstrated in Example I. Stabilization of alumina employing the method of the present invention utilizing the water insoluble, low molecular weight organo-silicon compound disclosed in British Pat. No. 1,492,274 was found to be ineffective when boehmite slurry (aqueous) was used as the alumina source.

EXAMPLE VI

A palladium alumina supported catalyst was prepared in accordance with the following procedure.

Four hundred (400) grams of gamma alumina powder was stabilized with an aqueous polydimethyl siloxane polymer (GE Silicone SM2133) in accordance with Example I. After calcining in air at 950° C. for 1 hour, the silicone stabilized alumina having a surface area of 162.5 m²/g was impregnated with an aqueous $PdCl_2$ solution containing 2.65 grams palladium, thereafter 16 ml of a dilute (10%) solution of $N_2H_4$ was added to the wet powder to reduce the Pd species and fix it on the alumina particles. The particle size of the palladium containing alumina was then reduced by ball milling with water and acetic acid to form a washcoat slurry.

A monolith support of cordierite containing about 400 flow passages per square inch of cross-section was dipped into the washcoat slurry. The excess was blown off the monolith by compressed air, and the monolith was dried to remove free water. The dried monolith was calcined at 500° C. for 20 minutes to provide a 20 g/ft³ palladium loading on the monolith. A core 1.5 inches in diameter and 3 inches in length was cut and separated from the monolith. The core was thermally aged in a reactor at 1,100° C. for 24 hours in a nitrogen stream containing 10% steam by volume.

After aging, the Pd containing monolith was evaluated in a reactor mounted on an engine dynomometer wherein the air-to-fuel ratio (A/F) was fluctuated ±1.0 A/F units at 1.0 Hz perturbations, an A/F of 14.65 being taken as the baseline of unit zero (the stoichiometric set point). The evaluation was performed at an inlet temperature of 400° C. and an exhaust gas flow rate of 80,000 volumes of gas per volume of catalyst per hour (VHSV). The catalytic efficiency of the monolith at the above described conditions are summarized in Table III. The results recorded in Table III show the amount of hydrocarbons ("HC"), carbon monoxide ("CO") and nitrogen oxides ("$NO_x$") which were removed from the exhaust.

For purposes of comparison, the procedure of Example VI was repeated with the exception that the washcoat was a comparative ceria stabilized alumina prepared in accordance with $C_3$ as disclosed in Example II. The monolith coated with this comparative washcoat is designated "$C_M$." The catalytic efficiency of $C_M$ under the conditions used in Example VI is also summarized in Table III.

TABLE III

CONVERSION EFFICIENCY OF THERMALLY AGED Pd CONTAINING MONOLITHIC CATALYSTS

| | % Conversion at A/F Shown | | | | | | | | | | | | | | | Surface Area $m^2/g$ |
|---|---|---|---|---|---|---|---|---|---|---|---|---|---|---|---|---|
| | 14.45 | | | 14.55 | | | 14.65 | | | 14.75 | | | 14.85 | | | |
| | HC | CO | $NO_x$ | HC | CO | $NO_x$ | HC | CO | $NO_x$ | HC | CO | $NO_x$ | HC | CO | $NO_x$ | After Aging |
| Ex. VI | 47 | 34 | 11 | 50 | 38 | 10 | 53 | 42 | 10 | 55 | 46 | 11 | 57 | 49 | 10 | 100.3 |
| $C_M$ | 10 | 5 | 6 | 14 | 2 | 6 | 22 | 6 | 6 | 30 | 11 | 5 | 36 | 18 | 6 | 10.6 |

By reference to Table III, it is apparent that with respect to the pollutant gases, the Pd metal on the siloxane polymer stabilized alumina support (Ex. VI) provided conversion performance superior to that obtained using a catalyst prepared by impregnating Pd metal on a ceria stabilized alumina support ($C_M$).

It is believed that the remarkable improvement in the conversion efficiency of the Pd catalyst dispersed on the siloxane polymer stabilized alumina support is due to the superior thermal stability of the stabilized alumina support material.

While specific components of the present invention are defined in the working examples above, many other variables may be introduced which may in any way affect, enhance or otherwise improve the present invention. These are intended to be included herein.

We claim:

1. A method for imparting thermal stability to an alumina support having a metal catalyst dispersed therein, the method comprising impregnating the alumina support with an aqueous dispersion of a high molecular weight polyorganosiloxane composition comprised of units having the formula:

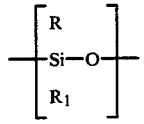

where R and $R_1$ are selected from the group consisting of hydrogen, an alkyl radical of 1 to 8 carbon atoms and mononuclear aryl radicals and the average number, n, of repeating chain units is at least 17 and thereafter calcining the impregnated alumina support.

2. The method of claim 1 wherein the average molecular weight of the polyorganosiloxane is in the range of about 1,500 to about 15,000.

3. The method of claim 1 wherein the average repeating chain units is from 20 to 150.

4. The method of claim 1 wherein the polyorganosiloxane composition of claims 1 has the general formula

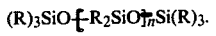

5. The method of claim 4 wherein the polyorganosiloxane has the formula

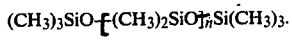

6. The method of claim 1 wherein the polyorganosiloxane composition is a polyether siloxane.

7. The method of claim 6 wherein the polyether siloxane is a siloxane oxyalkylene block copolymer.

8. the method of claim 7 wherein the siloxane oxyalkylene block copolymer is a block copolymer of polydimethyl siloxane and a polyoxyalkylene ether.

9. The method of claim 1 wherein the alumina support is impregnated with an amount of the aqueous dispersion of the polyorganosiloxane so that after calcination, the alumina support contains about 1 to about 20 percent $SiO_2$ based on the combined weight of the alumina.

10. The method of claim 1 wherein the metal catalyst is palladium.

11. A method of forming an alumina supported platinum group metal catalyst comprising the steps of contacting particles of high surface area alumina with an aqueous dispersion of a high molecular weight polyorganosiloxane calcining the polyorganosiloxane impregnated alumina support and dispersing a platinum group metal on said support.

* * * * *